Feb. 1, 1966 W. PULS 3,232,330
TIRE
Filed March 30, 1964

Inventor:
Wolfgang Puls
by
Michael S. Striker
Atty

United States Patent Office 3,232,330
Patented Feb. 1, 1966

3,232,330
TIRE
Wolfgang Puls, Leopold Strasse, 1, Karlsruhe, Germany
Filed Mar. 30, 1964, Ser. No. 355,586
4 Claims. (Cl. 152—330)

The present invention relates to a tire and, more particularly, the present invention is concerned with an elastomeric inflatable tire provided with means for indicating hidden damage to said tire.

While it is relatively simple by visual inspection, to determine the condition of the tire profile, it is not possible in this manner to determine whether in the interior structure of the tire any damage has occurred, or whether the inner side wall of the tire which is at least partially obstructed from view by the body of the vehicle to which the tire is mounted, has been damaged.

Particularly dangerous is damage which occurs underneath the elastomeric covering of the tire at or in its carcass. Such damage cannot be determined by visual inspection and, particularly upon driving at high speed, the danger exists that a tire having a damaged carcass portion will burst and thus might cause a serious accident.

It is therefore an object of the present invention to provide means for determining the condition or for determining any damage that might have occurred to a portion of the tire, particularly to a portion of the tire which cannot be visually inspected.

It is a further object of the present invention to provide means for determining damage to an interior portion of the tire such as the carcass.

Other objects and advantages of the present invention will become apparent from a further reading of the description and of the appended claims.

With the above and other objects in view, the present invention contemplates for use in a vehicle, an elastomeric inflatable tire comprising, in combination, a tire wall, and electrically conductive means embedded in the tire wall and having a pair of ends accessible at the exterior of the tire for connecting the means into an electrical circuit, the electrically conductive means automatically breaking between the ends thereof, when the wall portion of the tire is damaged, for interrupting the circuit and thus indicating damage to the wall portion.

According to a preferred embodiment of the present invention, the elastomeric inflatable tire comprises, in combination, opposite side walls, an electric conductor of low tear resistance embedded along a meandering path in at least one of the side walls, means for passing an electric current through the elongated electric conductor, and indicator means operatively connected to the conductor and adapted to indicate interruption of current flow through the elongated conductor, so that in the case of damage to the one side wall in the vicinity of the elongated conductor the latter will be torn and thereby current flow therethrough interrupted thus causing the indicator means to indicate damage to the side wall of the tire.

Thus, according to the present invention, the condition of the elastomeric inflatable tire can be controlled by incorporating in the tire at least one wire or band-shaped, elongated electric conductor which preferably extends in zig-zag or along a meandering or tortuous path, which conductor is embedded in the tire but has a pair of ends which are accessible at the exterior of the tire. The location of the accessible ends preferably will be such that a source of electric current can be easily attached thereto while the tire is mounted on a vehicle in operative position. The location of the electric conductor within the tire, the dimensions of the same and the manner in which the same is attached or fixed within the tire, will be so chosen that upon damage to the tire portion in the vicinity of the electric conductor, the same will be torn and thus the passage of electric current through the conductor will be interrupted. Thus, an electrically conductive testing wire or the like having a low tear resistance is embedded in the resilient inner structure of the tire, for instance in contact with the carcass so that the conductor will pass either through a relatively large portion of the tire or just through a certain section therefor which is to be checked against possible damage. Upon damage to the tire wall in the vicinity of the embedded conductor, the conductor will tear. Consequently, upon connecting the accessible ends of the conductor with a source of current and a suitable indicator, it will be shown by the indicator whether or not current actually passes through the conductor between the two accessible ends thereof. If the tire has been damaged and as a consequence thereof the conductor in the interior of the tire has been broken, it will not be possible to show the passage of current at the accessible ends of the conductor.

In such case, by testing from the outside, the driver of the vehicle will be timely advised of the fact that damage in the interior of the tire has occurred and that a certain risk is involved in further usage of the tire. Thus, the driver can then avoid the particularly dangerous driving at high speed and change the tire at the next opportunity. In any event, by checking the tire condition in the manner described above, prior to starting the operation of the vehicle, for instance every morning, it can be avoided that the vehicle with such tire is operated at high speed if at the time of testing the interior of the tire had already been damaged.

The electric conductor may be a single wire or a wire rope twisted or braided of a plurality of very thin wires. It is also possible to use as the electric conductor a wire fabric formed of a single conductive weft thread and non-conductive warp threads.

Preferably, the conductor is arranged in the interior of the tire side wall, preferably as close as possible to the inner face of the side wall and in such a manner that the major portion of the length of the conductor will extend in axial direction of the tire, for instance from the inner toward the outer edge thereof. However, if it is desired to control instead of the entire tire wall only certain portions thereof such as the particularly pressure resisting relatively thinner side walls, then a separate conductor may be arranged in each of the two side walls of the tire, or only in one of the two side walls and the ends of the individual conductors which are accessible from the outside may either be joined so that one source of electric current can be attached thereto, or may be maintained separately so that upon applying a source of electric current to one or the other set of accessible ends of the one or the other conductor, it will be determined in which area of the tire a damage has occurred, inasmuch as interruption of the passage of current through one or the other conductor will be separately indicated. The electric conductor is preferably firmly adhesively adhered to the tire wall portion contacted by the same, or vulcanized thereto, so that upon excessive tensioning of the tire wall, the electric conductor will tear together with the adjoining tire wall portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
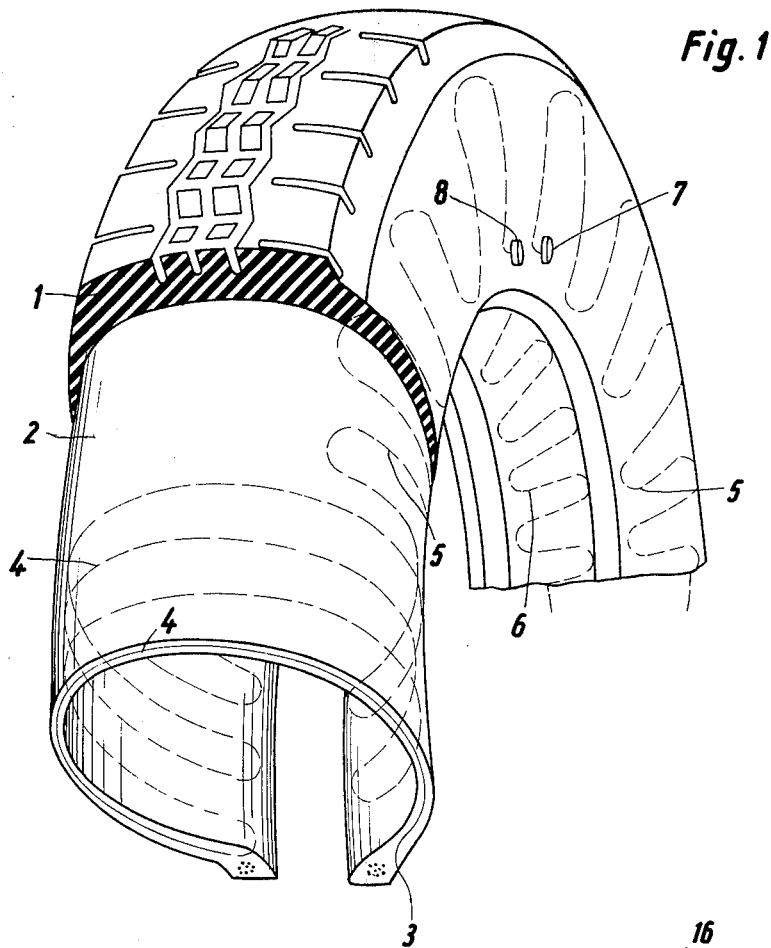
FIG. 1 is a fragmentary perspective view, partially in cross section of a tire according to the present invention.

Referring now to the drawing, and particularly to FIG. 1, it will be seen that the tire 1 includes a rope or fabric carcass 2 in which is arranged an electric conductor 3 consisting of a wire which runs along a meandering path in the carcass of the tire. As illustrated at 4, the conductor extends from rim to rim in axial direction throughout the entire tire wall, while as illustrated at 5, the conductor is arranged along a meandering path in one of the side walls of the tire. Either one or the other of these two embodiments may be incorporated in a tire, whereby in the case of wire arrangements which are located in only one side wall of the tire, such as the arrangement 5, a similar ararngement may also be located in the opposite side wall.

The wire or wire rope forming electric conductor 3 starts and terminates at the outer side face of the tire where terminals 7 and 8 are located.

Terminals 7 and 8 serve for attaching a conventional device for checking the passage of electric current through the embedded wire between terminals 7 and 8. By thus testing the conductive condition of the embedded conductor, it will be determined whether the same has been broken and any break in the conductor, indicated by lack of conductivity between terminals 7 and 8 is then an indication of damage to the interior portion of the tire in the vicinity of the embedded conductor.

It is preferred to embed the conductor simultaneously with incorporating the carcass in the tire structure so that any tearing of the carcass will cause tearing of the electric conductor. If the carcass consists of or contains steel rope, then the electric conductor of the present invention must be covered with a layer of insulating material.

Figure 2:
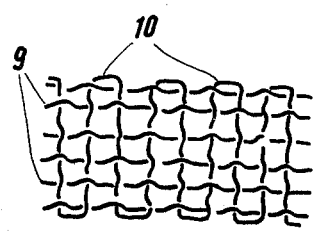
FIG. 2 is a wire mesh of the type which may be used to form the electric conductors of the present invention.

FIG. 2 illustrates a wire mesh or fabric which may be embedded as electric conductor in the carcass, preferably close to the inner face of the carcass and may be adhesively or by vulcanizing adhered thereto. The warp threads 9 of the wire mesh are formed of electrically non-conductive material, while weft thread 10 is a continuous electrically conductive wire or the like which thus will be embedded in the carcass or in the tire along a meandering path.

In place of a single set of terminals 7 and 8, it is also possible to subdivide the conductor into several sections and to provide each of the sections with individual terminals so that the exact location of the damage can be determined by determining between which set of terminals current flow cannot be accomplished.

Figure 3:
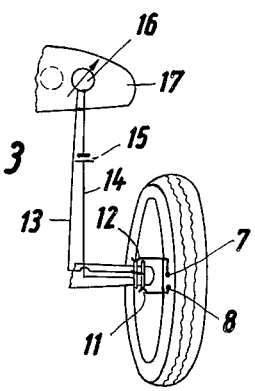
FIG. 3 is a schematic view of a circuit arrangement for the continuous control of the tire condition in accordance with the present invention.

It is also within the scope of the present invention to continuously control the condition of the tire and this is shown in FIG. 3 in a schematic manner namely thus that terminals 7 and 8 located in this case in the outer face of the tire directed toward the interior of the vehicle are connected to suitable indicator means which include slip rings 11 and 12 and conductors leading therefrom to an indicating instrument 16 located at the dashboard of the car. A source of electric current is indicated at 15 and the connecting wires between slip rings 11 and 12 on the one hand and the source of electric current 15 and the indicator 16 are shown by reference numerals 13 and 14.

In this manner, it is possible to keep the tire condition continuously under observation or, if desired, a suitable switch (not shown) could be arranged so that the driver whenever he desires can close the circuit and activate the indicator means.

Figure 4:
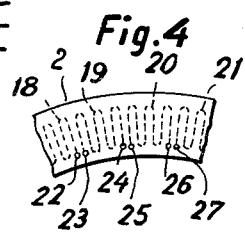
FIG. 4 is a fragmentary schematic view of a tire including a modified arrangement according to the present invention.

FIG. 4 shows in a schematic manner a plurality of electrically conductive means 18, 19, 20 and 21. Each of these means is provided with a pair of ends connected with connecting means 22; 23, 24; 25, 26; 27. By this way it is possible to locate any damage.

It will be understood that each of the elements described above, or two or more together, may also find a useful application in other types of tires differing from the types described above.

While the invention has been illustrated and described as embodied in an elastomeric inflatable tire preferably for a motor vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use in a vehicle, an elastomeric inflatable tire comprising, in combination, a tire wall; and electrically conductive means comprising a mesh consisting essentially of a continuous electrically conductive weft thread and non-conductive warp means embedded in said tire wall and having a pair of ends accessible at the exterior of the tire for connecting said means into an electrical circuit, said electrically conductive means automatically breaking between said ends thereof, when said wall portion of said tire is damaged, for interrupting the circuit and thus indicating damage to said wall portion.

2. For use in a vehicle, an elastomeric inflatable tire comprising, in combination, a tire wall; and a plurality of electrically conductive means, each embedded in a different section of said tire wall and each provided with a pair of ends accessible at the exterior of the tire so that upon connecting said means into an electrical circuit the section of said tire containing the damaged wall portion can be determined.

3. For use in vehicle, an elastomeric inflatable tire, comprising, in combination, opposite side walls; an electric conductor of low tear resistance embedded along a meandering path in at least one of said side walls; means for passing an electric current through said elongated electric conductor; and indicator means operatively connected to said conductor and adapted to indicate interruption of curent flow through said elongated conductor, so that in the case of damage to said one side wall in the vicinity of said elongated conductor the latter will be torn and thereby current flow therethrough interrupted thus causing said indicator means to indicate damage to said side wall of said tire.

4. For use in a vehicle, an elastomeric inflatable tire comprising, in combination, opposite side walls; at least one elongated electric conductor of low tear resistance embedded in at least one of said side walls; means for passing an electric current through said elongated electric conductor; and indicator means operatively connected to said conductor and adapted to indicate interruption of current flow through said elongated conductor, so that in the case of damage to said one side wall in the vicinity of said elongated conductor the latter will be torn and thereby current flow therethrough interrupted thus causing said indicator means to indicate damage to said side wall of said tire.

References Cited by the Examiner
UNITED STATES PATENTS

| | | | |
|---|---|---|---|
| 1,945,283 | 1/1934 | Loomis | 152—330 |
| 2,948,321 | 8/1960 | Mote | 152—330 |

ARTHUR L. LA POINT, *Primary Examiner.*